Sept. 2, 1969   A. S. ROGERS, JR   3,464,689
CATCHER MECHANISM FOR CLOTH SPREADING MACHINE
Filed Nov. 15, 1967   3 Sheets-Sheet 2

INVENTOR:
ASA SCOBEY ROGERS, JR.
BY
Harrington A. Lackey
ATTORNEY

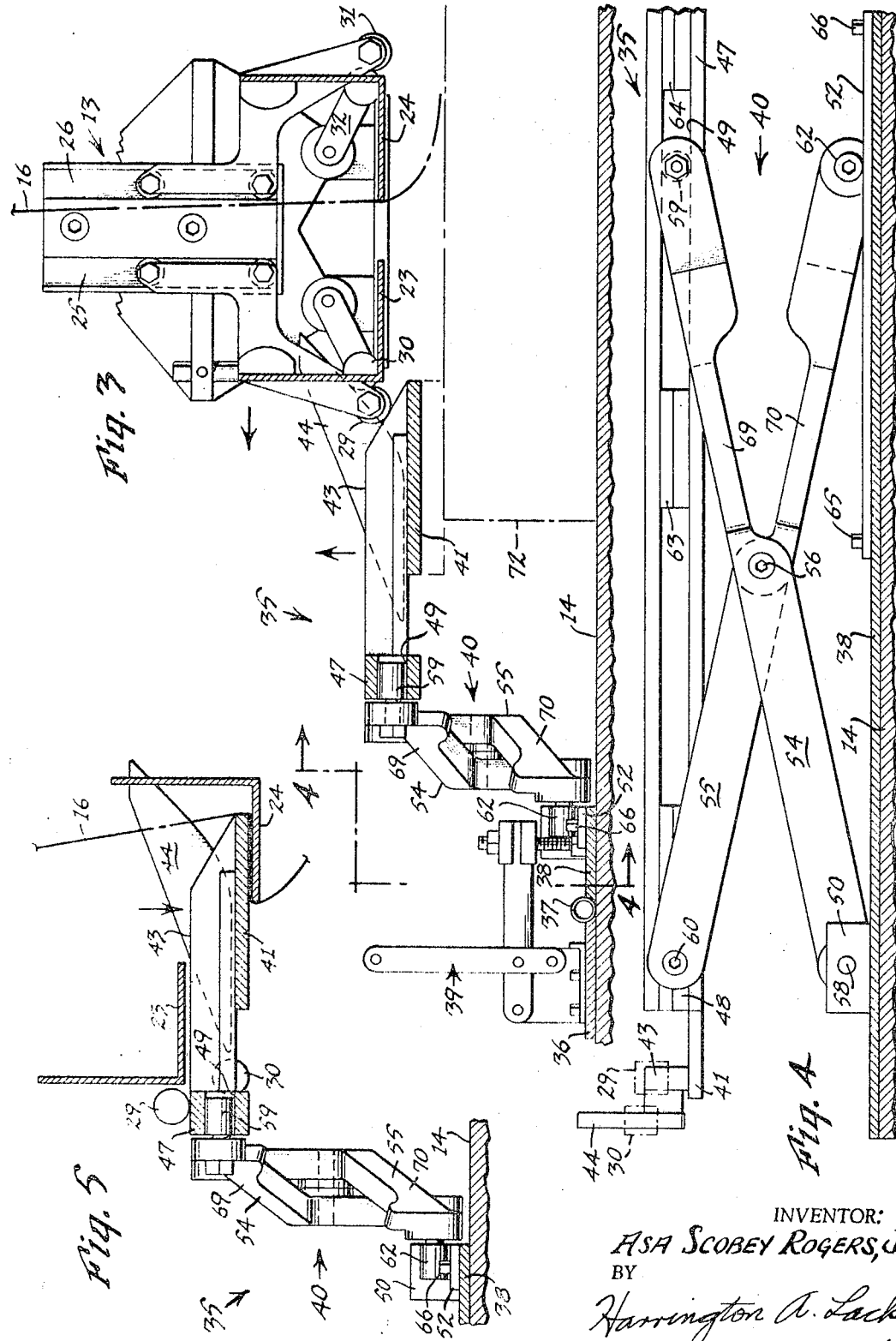

United States Patent Office 3,464,689
Patented Sept. 2, 1969

1

3,464,689
CATCHER MECHANISM FOR CLOTH
SPREADING MACHINE
Asa Scobey Rogers, Jr., Nashville, Tenn., assignor to
Cutters Machine Company, Inc., Nashville, Tenn., a
corporation of Tennessee
Filed Nov. 15, 1967, Ser. No. 683,379
Int. Cl. B65h 29/46, 45/20
U.S. Cl. 270—31                                  8 Claims

ABSTRACT OF THE DISCLOSURE

A catcher mechanism including a catcher bar adapted to cooperate with the spreader unit of a cloth spreading machine reciprocably movable toward and away from the catcher mechanism, in which the catcher bar is supported by a scissors-type linkage mechanism to constrain the catcher bar to vertical reciprocable movement so that the catcher bar is always maintained in a horizontal position.

Background of the invention

This invention relates to cloth spreading machines, and more particularly to a catcher mechanism for a cloth spreading machine.

In the art of cloth spreading, there is a type of cloth spreading machine which is mounted on a spreading table for reciprocable movement along the table, and which is adapted to spread an indeterminate length of cloth in folded layers upon the table. In order to fold the cloth into layers, the moving machine is provided with a spreader unit, including one or two fold blades, and a catcher mechanism mounted upon the table at one or both ends of the reciprocable travel of the machine for operative engagement with a fold blade to form a fold in the cloth.

The catcher mechanism includes a transversely disposed catcher bar mounted for free, vertical reciprocable movement, and which is elevated by mechanism associated with the catcher bar and the spreader unit as the spreader unit approaches the catcher bar. As the spreading machine moves away from the catcher mechanism, the catcher bar is permitted to drop upon the folded end of the cloth in order to retain the folded end as the cloth is spread away from the catcher mechanism by the spreader unit.

Since the cloth spread by the above spreading machines is of substantial width, and the catcher bar must have a length at least equal to the width of the cloth to be spread, the means supporting the catcher bar must permit the ctacher bar to fall in parallel relationship with the table to evenly retain all portions of the folded end of the cloth.

There are many types of supporting means for a catcher bar, but generally they include uprights for supporting the opposite ends of the catcher bar for vertical reciprocable movement. One example of such a catcher bar support mechanism is disclosed in application S.N. 540,026, filed Apr. 4, 1966 of Thomas W. Martin, Sr. et al. for "Cloth Spreading Machine" now Patent No. 3,400,927. In this application, the uprights comprise vertical tracks supporting cam rollers fixed to the ends of the catcher bar. Although such catcher bar supports are generally satisfactory, it can easily be seen how, with sufficient play or mis-adjustment between the rollers and the tracks, each end of the catcher bar can operate independently of the other end so that the catcher bar would not longer be maintained in parallel relation with the cloth spreading table.

2

Summary of the invention

It is therefore an object of this invention to provide a catcher mechanism for a cloth spreading machine in which the means for supporting the catcher bar will permit free, vertical reciprocable movement of the catcher bar with respect to the cloth spreading table, but will rigidly constrain the movement of the catcher bar to positions always parallel to the spreading table.

Another object of this invention is to provide a catcher mechanism for a cloth spreading machine in which the means for supporting the catcher bar for vertical reciprocable movement comprises a scissors-type linkage between the catcher bar and a fixed base.

A further object of this invention is to provide a mechanism for supporting a catcher bar for vertical reciprocable movement including a pair of crossed link bars pivotally connected together at their centers with the extremities of the bars connected to the catcher bar and the elongated supporting transverse base by a combination of pivotal and translatory connecting members.

Another object of this invention is to provide a supporting linkage mechanism for a catcher bar of relatively simple and economical construction.

Brief description of the drawings

FIG. 3 is a section taken along the line 3—3 of FIG. 2, showing the spreader unit approaching and initially engaging the catcher mechanism;

FIG. 4 is a section taken along the line 4—4 of FIG. 3; and

FIG. 5 is a sectional elevation similar to FIG. 3, showing the positions of the fold blades and catcher bar in a subsequent operative position.

Description of the preferred embodiment

Figure 1:
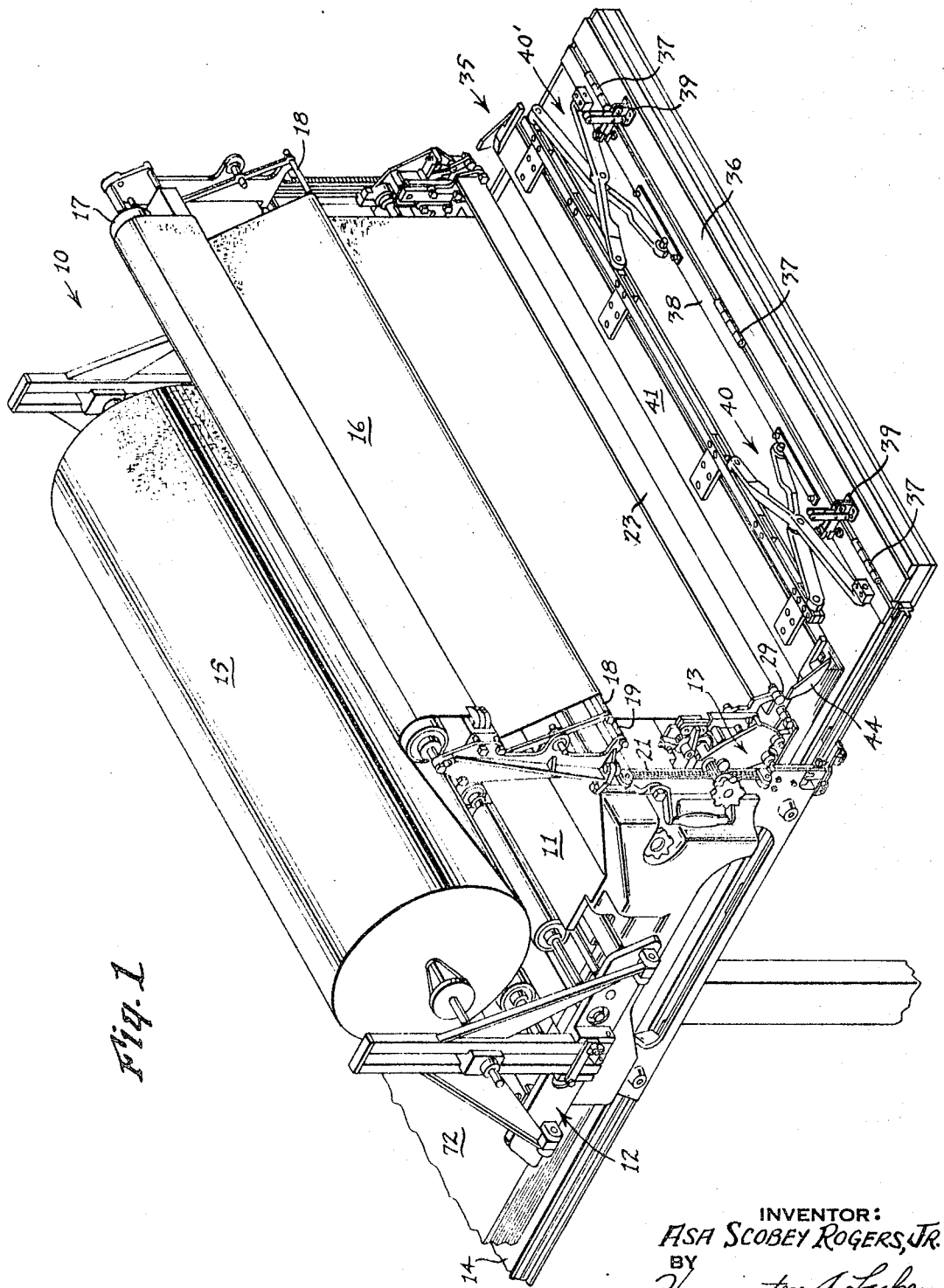
FIG. 1 is a perspective view of a cloth spreading machine and a catcher mechanism made in accordance with this invention mounted upon a cloth spreading table, shown fragmentarily.

Referring now to the drawings in more detail, FIG. 1 discloses a cloth spreading machine 10 similar to that disclosed in application S.N. 540,026 of Thomas W. Martin, Sr. et al. for "Cloth Spreading Machine." The machine 10 includes a frame 11 supporting a cloth carriage 12 and a spreader unit 13 for longitudinal reciprocable movement upon a spreading table 14. The cloth carriage 12 supports, for rotatable movement, a cloth supply roll 15 from which a layer of cloth 16 is fed and guided over intermediate guiding elements, such as the top roll 17 and guide rods 18 and 19 to the spreader unit 13.

The spreader unit 13 is adapted to be elevated upon the frame 11 by means of the rotatable pinion wire or rod 20 engaging the rack 21. The spreader unit 13 includes a front fold blade 23 and a rear fold blade 24 also mounted for free vertical reciprocable movement in tracks 25 and 26 (FIG. 3) on the spreader unit 13. A cam roller 29 is mounted on each end of the front fold blade 23, and a follower arm carrying another cam roller 30 is pivotally mounted upon the spreader unit at opposite ends of the front fold blade 23. Similar rear cam rollers 31 are located at each end of the rear fold blade 24, and similar rear pivoted cam follower arms and rollers 32 are mounted on the spreader unit 13 at opposite ends of the rear fold blade 24.

Although there should be a catcher mechanism at each end of the longitudinal travel of the spreading machine 10 in order to cooperate with each of the front and rear fold blades 23 and 24, since both catcher mechanisms would be constructed identically, only the front catcher mechanism 35 is being disclosed and described.

The front catcher mechanism 35 includes an elongated base plate 36 fixed in any convenient manner to and transversely of the top of the table 14 at the forward extremity of travel of the cloth spreading machine 10. Pivotally connected to the edge of the fixed base plate 36 by hinges 37 is a hinged base plate 38 also extending transversely of and upon the table top 14. One or more latch mechanisms 39 may be fixed to the fixed base plate 36 in order to maintain the hinged base plate 38 locked in its operative position disclosed in the drawings. The particular latching mechanism 39 disclosed in the drawings is provided with a linkage adapted to be pivoted beyond dead center in order to hold the hinged base plate 38 against the table top 14. The particular construction of the latching mechanism 39 forms no part of the invention.

Mounted above the hinged base plate 38 for vertical reciprocable movement and in constant parallel relation thereto by a scissors-type linkage mechanism 40 is an elongated transverse catcher bar 41. The opposite ends of the catcher bar 41 are provided with cam 43 and cam plate 44 in longitudinal alignment with, and for respective operative engagement with, the front cam rollers 29 and follower arm cams 30, in a manner described in the said pending application S.N. 540,026.

Except for the scissors-type linkage mechanism 40 and its supporting base construction 36–38, the parts thus far described are known in the art, and most of them have been previously described in the said pending application S.N. 540.026.

In order to avoid confusion between the terms "front" and "rear," the elongated edge of the catcher bar 41 opposing the spreader unit 13 will be referred to as the operative edge 45, while the opposite elongated edge of the catcher bar 41 will be referred to as the remote edge 46.

Fixed to the remote edge 46 adjacent the near or operator's side or end of the catcher mechanism 35 is an elongated bracket 47 parallel to the catcher bar 41. The bracket 47 includes the pivot block 48 and an elongated track 49. Substantially vertically below the pivot block 48 is another pivot block 50 fixed to the top of the hinged base plate 38. Also substantially below the elongated track 49 in the bracket 47 is a track or rail 52 fixed to the top of the hinged plate 38.

The scissors-type linkage mechanism 40 includes a pair of crossed link bars 54 and 55, of substantially equal lengths and pivotally connected at their respective centers, that is the points mid-way between their respective ends, by a pivot pin 56. The lower end of the link arm 54 is preferably pivotally connected to the fixed pivot block 50 by the pivot pin 58. The upper end of the same link bar 54 is provided with a guide member, such as the guide roller 59, received for longitudinal reciprocable movement in the track 49 of the bracket 47.

The upper end of the other link bar 55 is provided with a pivot pin 60 pivotally connected to the pivot block 48 of the bracket 47. The lower end of the same link bar 55 is provided with a guide member, such as guide roller 62, adapted to engage and ride longitudinally of the rail 52.

The ends of the track 49 terminate in blocks 63 and 64, the location of which determines the length of travel of the upper guide roller 59. In a similar manner, the stop pins 65 and 66 determine the length of travel of the lower guide roller 62.

Figure 2:
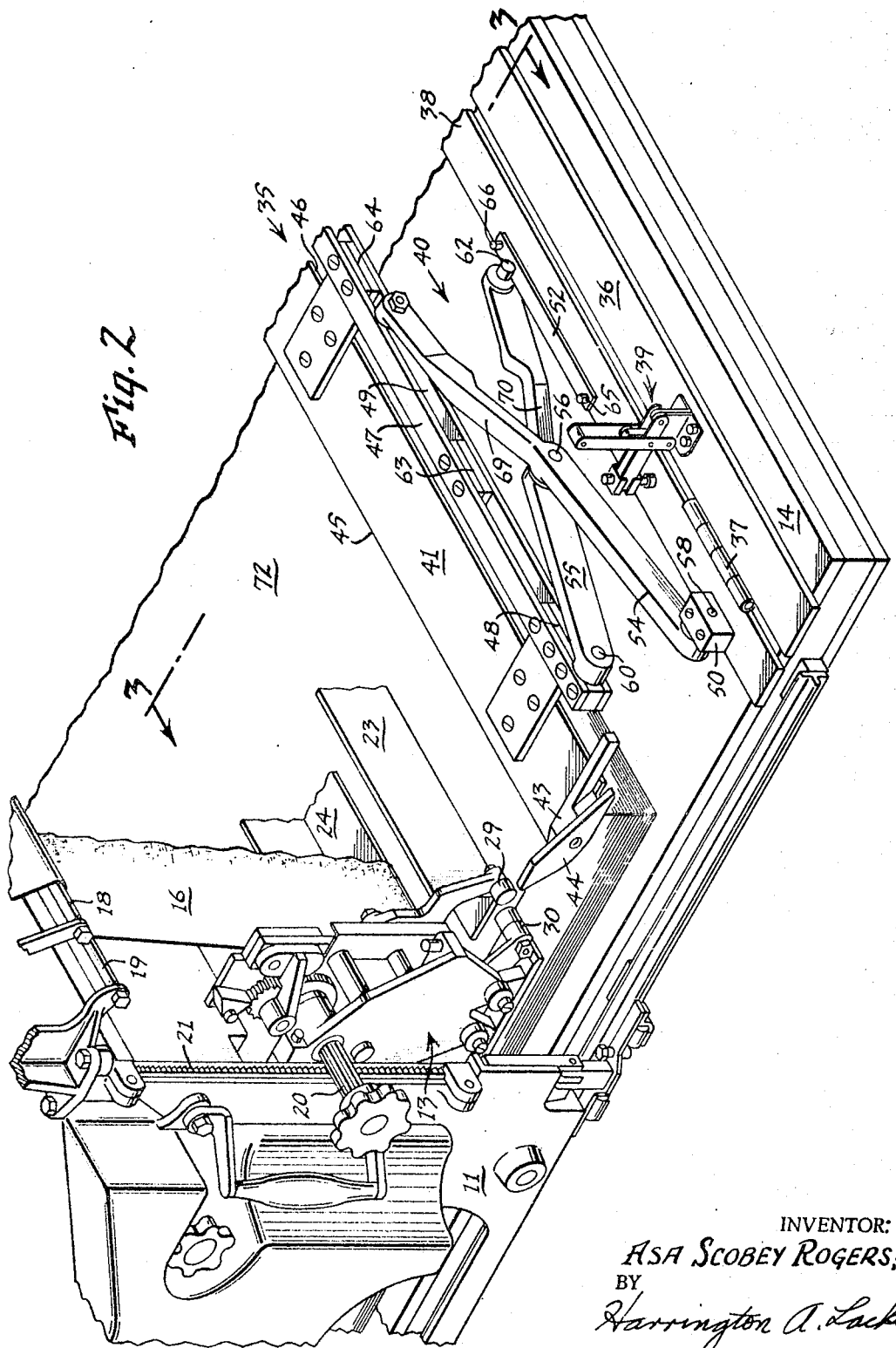
FIG. 2 is an enlarged fragmentary perspective view of a portion of the spreading machine and catcher mechanism disclosed in FIG. 1.

It will be noted in the drawings, particularly FIGS. 2, 3 and 4, that the upper ends of the arms 54 and 55 are disposed in substantially the same vertical transverse plane, so that they may be easily connected to their respective portions of the straight transverse bracket 47 for operative movement. Furthermore, the lower ends of the respective arms 54 and 55 are located in the same vertical transverse plane spaced from the plane of the upper ends toward the base plate 38, so that the lower ends are connected in operative position along the straight longitudinal edge of the hinged plate 38. In order to position the upper ends and lower ends of the arms 54 and 55 in the parallel transverse planes, angular portions 69 and 70 formed in the arms 54 and 55 cross each other in a transverse vertical plane on the remote side of the pivot pin 56 from the operator's side, so that the remote extremities of the respective arms 54 and 55 will be located in the respective transverse vertical planes different from their corresponding opposite ends, that is, from the proximate ends.

Also, the angular portions 69 and 70 are reduced in their vertical dimensions, so that the link arms 55 and 54, when pivoting to a collapsed position, will permit the catcher bar 41 to attain as low an elevation as possible relative to the hinged plane 38 and the table 14.

In the operation of the invention, assuming that the spreading machine 10 is moving forward toward the catcher mechanism 35, the fabric 16 is fed from the supply roll 15 across the top roller 17, guide rods 18 and 19 and beneath the rear fold blade 24, as disclosed in FIGS. 1, 2 and 3. The rear end of the top layer of fabric 16 on the stack 72 is held by a catcher mechanism, not shown, similar to the catcher mechanism 35, but mounted at the rear end of the table 14. The catcher bar 41 will be resting upon the forward folded ends of the stack of fabric layers 72. As the machine 10 approaches the catcher mechanism 35, as disclosed in FIGS. 1 and 2, and then subsequently in FIG. 3, the front cam roller 29 engages and is elevated by the cam 43 to lift the idle front fold plate 23 above the catcher bar 41. At about the same time, the front cam follower 30 engages the bottom edge of the cam plate 44, forcing the cam plate 44 upward with the catcher bar 41. As the catcher bar 41 is elevated, the link arms 54 and 55 pivot about their respective pivot pins 58, 56, and 60, and the guide rollers 59 and 62 move in their respective tracks 49 and 52 toward the pivoted ends 60 and 58.

At this point, it will be noted that two of the scissors-type linkage mechanisms 40 and 40' are disclosed in FIG. 1, both of which are constructed and function identically and simultaneously to maintain the catcher bar 41 in a horizontal position in all its elevational positions.

After the catcher bar 41 is elevated by the cam followers 30, the rear fold blade 24 carries the fabric 16 beneath the catcher bar 41 until the cam follower 30 moves completely beneath the cam plate 44, as disclosed in FIG. 5, whereupon the catcher bar 41 immediately drops upon the fabric 16 and fold blade 24 to form a tuck or fold at the forward end of the fabric layer. The direction of the machine 10 is then reversed by appropriate control mechanism, not shown, to withdraw the rear fold blade 24 from beneath the catcher bar 41, which continues to hold the forward folded end of the fabric 16. The forward fold blade 23 is lowered as its cam roller 29 descends from the cam 43, and engages the depending fabric 16 to spread the cloth in the opposite direction toward the catcher mechanism, not shown, at the rear end of the table 14.

After the machine 10 begins to move toward the rear of the table 14, the latching mechanism 39 may be unlatched to swing the hinged base plate 38 together with the linkage mechanisms 40 and 41' and catcher bar 41 about the hinges 37 and away from the spreading machine 10 so that forward folded ends of the stack 72 are clearly exposed for the transverse cutting of the forward folded ends, if desired.

If the scissors-type linkage mechanism 40 has link arms 54 and 55 sufficiently long and strong enough, it is conceivable that only a single linkage mechanism 40 may be employed for maintaining the catcher bar 41 at true horizontal positions at all stages of elevation. However, in order to simplify the engineering, as well as the economics of the linkage construction, two mechanisms 40 and 40' located, as substantially disclosed in FIG. 1, is a preferred means of supporting the catcher bar 41. Of course, it will be understood that any number of such mechanisms 40 or 40' may be employed in order to obtain the desired strength for the particular size and weight of the catcher bar 41.

The limits of the elevational movement of the catcher bar 41 are determined by the length of the link arms 54 and 55 and the length of the tracks 49 and 52.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A catcher mechanism for a cloth spreading machine adapted to reciprocably move toward and away from said catcher mechanism, comprising:
   (a) an elongated base disposed transversely of the reciprocable path of said spreading machine,
   (b) an elongated catcher bar,
   (c) a scissors-type linkage mechanism including a pair of crossed pivotally connected link bars having respective upper ends and lower ends,
   (d) said upper ends being conected to said catcher bar and said lower ends being connected to said base to constrain said catcher bar to vertical reciprocable movement relative to said base so that said catcher bar is always parallel to said base,
   (e) means on said cloth spreading machine to move said catcher bar as said cloth spreading machine moves toward said catcher bar.

2. The invention according to claim 1 in which said link bars are pivotally connected together mid-way between the respective upper and lower ends of each bar.

3. The invention according to claim 2 in which one of said ends of one link bar is connected to one of said base or catcher bar for pivotal movement only, the opposite end of said one link bar is connected to the other of said base or catcher bar for longitudinal movement thereof, and one end of said other link bar is connected to said one of said base or catcher bar for longitudinal movement thereof.

4. The invention according to claim 2 in which said link bars are of equal length, the lower end of one bar is connected to said base for pivotal movement only, the upper end of the other bar is connected to said catcher bar for pivotal movement only, the upper end of said one bar is connected to said catcher bar for longitudinal movement thereof, and the lower end of said other bar is connected to said base for longitudinal movement thereof.

5. The invention according to claim 4 in which said catcher bar has an operative edge opposing said spreading machine, and a remote edge, the upper end of said other link bar being pivotally connected to said rear edge, an elongated upper track mounted along said rear edge, and an upper guide member received in said upper track for longitudinal movement thereof, the upper end of said one bar being pivotally connected to said upper guide member.

6. The invention according to claim 5 further comprising an elongated lower track mounted longitudinally of said base, and a lower guide member connected to the lower end of said other bar for reciprocable movement longitudinally of said lower track.

7. The invention according to claim 1 further comprising a spreader unit on said spreading machine including a fold blade and a cam follower, a cam on said catcher bar for engaging said cam follower to elevate said catcher bar above said fold blade when said spreading machine is moved into operative position adjacent said catcher mechanism in order to fold a layer of cloth.

8. The invention according to claim 7 further comprising a horizontal spreading table, said elongated base being fixed to and transversely of said table, and said spreading machine being supported on said table for movement toward and away from said catcher mechanism.

References Cited

UNITED STATES PATENTS

| | | | |
|---|---|---|---|
| 2,539,722 | 1/1951 | Booth | 270—30 |
| 2,924,450 | 2/1960 | Deichmann | 270—31 |

EUGENE R. CAPOZIO, Primary Examiner

PAUL V. WILLIAMS, Assistant Examiner

U.S. Cl. X.R.

270—79